Feb. 22, 1966    G. O. WILLIAMS    3,237,083
WELDING TRANSFORMER WITH VARIAC IN
THE CONTROL WINDING SUPPLY LINE
Filed Dec. 13, 1961    2 Sheets-Sheet 1

INVENTOR.
GLYN O. WILLIAMS
BY *Toulmin & Toulmin*
ATTORNEYS

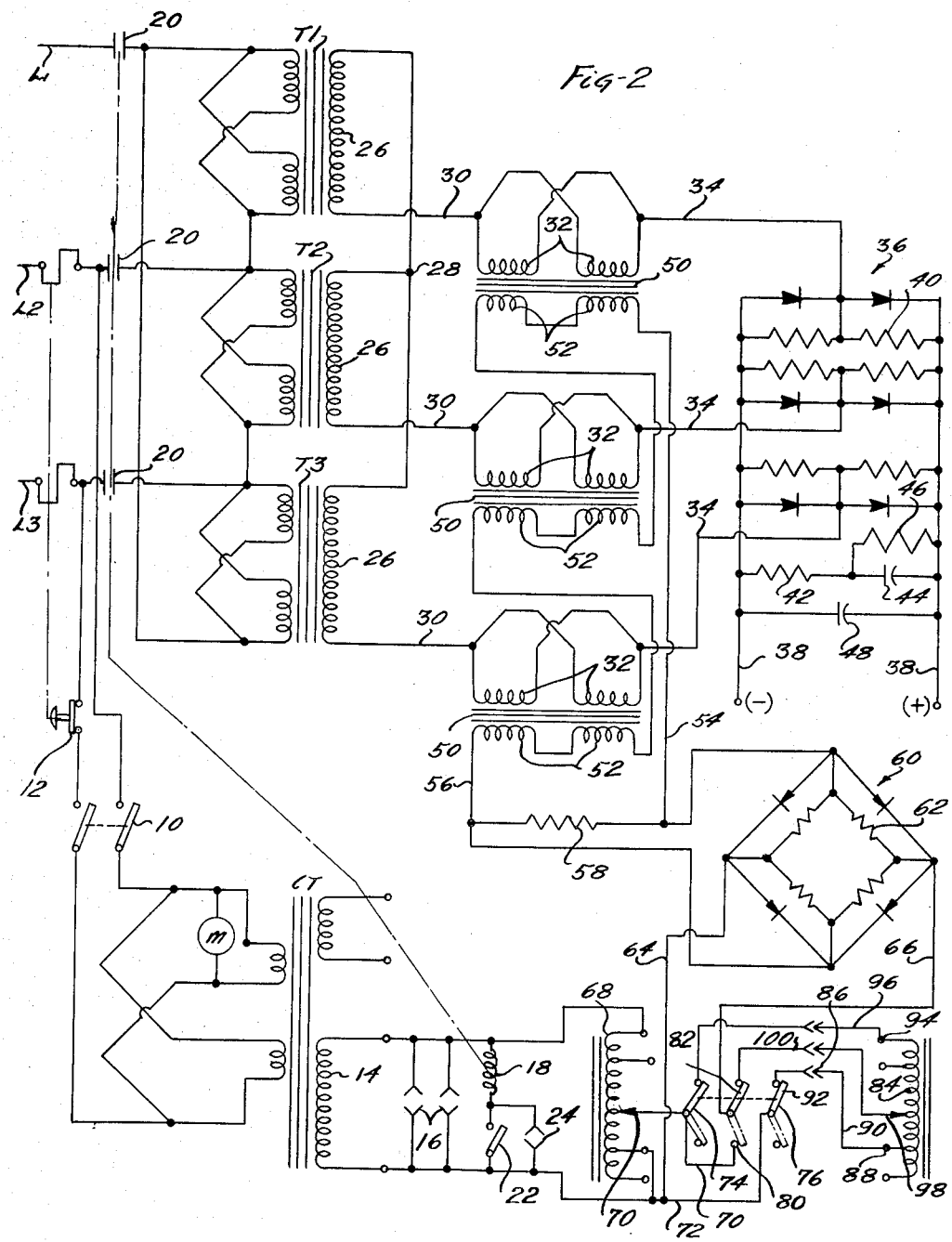

United States Patent Office 3,237,083
Patented Feb. 22, 1966

3,237,083
WELDING TRANSFORMER WITH VARIAC IN THE CONTROL WINDING SUPPLY LINE
Glyn O. Williams, Troy, Ohio, assignor to Hobart Brothers Company, Troy, Ohio, a corporation of Ohio
Filed Dec. 13, 1961, Ser. No. 159,178
3 Claims. (Cl. 321—25)

This invention relates to electric welders and is particularly concerned with a novel control arrangement for controlling the output of such a welder.

Electric welders are widely used and may, for example, comprise a bank of transformers with the output therefrom being rectified to provide a supply of direct current to the welding electrodes. At other times, the current supplied to the welding arc is alternating current. The voltage regulation of the transformer in an electric welder is extremely important in order to provide for the proper voltage at the welding arc and the proper characteristics of the voltage.

The particular electric welder shown in this application to demonstrate the present invention comprises secondaries of the welding transformers and the rectifiers wherein the secondary current is converted into direct current. These reactors are of the saturable core type so that by varying the saturation of the reactor cores, the reactance of the reactors can be varied, and the characteristics of the voltage at the welding electrodes can be regulated.

The control of the saturation of the reactor cores is accomplished by a supply of direct current to saturating windings carried by the reactor cores and it is in particular connection with the control of the direct current supply to the control windings of the saturable core reactors that the present invention is concerned.

Heretofore, the control of the control current has been accomplished by the use of fragile rheostats or potentiometers inserted in the direct current supply to the control windings of the reactors. An arrangement of this type, for example, is illustrated in the co-pending application Serial No. 158,984, filed December 13, 1961 in the name of William Schober and assigned to the same assignee as the present invention.

Such rheostats or potentiometers are not only fragile but they are also expensive and consume a substantial amount of power.

The primary object of the present invention is to provide an arrangement wherein variable control of the output of an electric welder can be effected without any substantial absorption or loss of power in the regulating device.

Another object of this invention is the provision of an arrangement for controlling a supply of direct current, and particularly to the control windings of a saturable core reactor, in which fragile and expensive potentiometers are eliminated thereby eliminating expensive auxiliary equipment and also eliminating a source of power loss.

These and other objects of the present invention become more apparent upon reference to the following specification taken in connection with the accompanying drawings in which:

FIGURE 2 is a diagrammatic representation of the wiring diagram of the welder.

Figure 1:
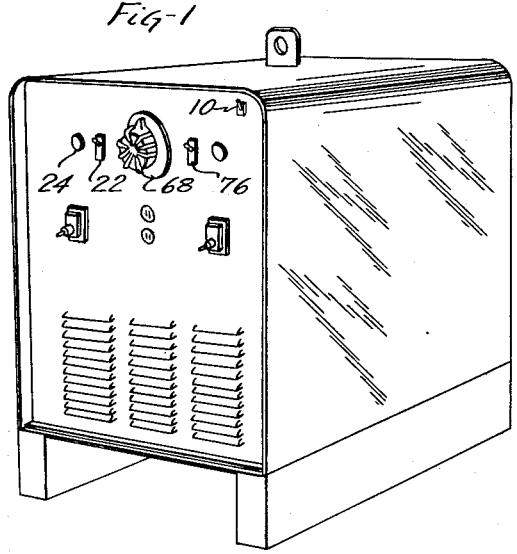
FIGURE 1 is a perspective view of a direct current welder constructed to practice the present invention.

Referring to the drawings somewhat more in detail, the electric welder according to the present invention comprises the main transformers T1, T2 and T3 which have their primary coils connected in delta and with the power lines L1, L2 and L3.

There is also a control transformer CT having primary coils connected through an on-off switch 10 and an overload switch 12 with power lines L2 and L3.

The control transformer CT has a secondary winding 14 and across the terminals thereof are connected receptacles 16 for supplying voltage at 115 volts for auxiary purposes.

Also, connected across the terminals of secondary 14 of the control transformer is the coil 18 of a contactor which controls the normally open blades 20 in the power lines L1, L2 and L3. Coil 18 is in circuit with a selector switch 22 which is connected in parallel with a receptacle 24.

When switch 22 is closed, closing of switch 10 will bring about energization of coil 18. When switch 22 is open, however, an extension is plugged into receptacle 24 and a switch on the extension can be utilized for controlling the energization of coil 18.

Returning to the main welding transformers, each thereof has a secondary winding 26 which may, if desired, be provided with taps for changing the secondary voltage. The secondary windings are connected in star with a common terminal at 28. The outer terminal of each of the windings 26 is then connected by wire 30 with one end of windings 32 of a reactor.

A wire 34 connects the other end of the said winding of each reactor with an input terminal of a three-phase full wave rectifier bank 36. This rectifier bank has output terminals connected by wires 38 with the plus and minus welding terminals.

Each individual rectifier in the rectifier bank is by-passed by a surge resistor 40 and there may be provided between wires 38 the additional surge resistor 42 which is in series with a filter capacitor 44 which is, in turn, by-passed by a bleeder resistor 46. Another filter capacitor 48 is connected directly between wires 38.

Each of the aforementioned reactors has an iron core 50 and saturating windings 52. The saturating windings are connected in series and there is a wire 54 leading to one end of the serially connected windings 52 and a wire 56 leading to the other end thereof. A discharge resistor 58 is connected between wires 54 and 56 and the two wires lead to the output terminals of a control rectifier 60.

Each rectifier of the rectifier bank 60 is by-passed by surge resistor 62. The rectifier bank 60 has input terminals to which are connected wires 64 and 66.

Returning now to the control transformer CT, there is connected across the terminals of secondary winding 14 thereof an auto transformer 68 having a slide terminal at 70. The auto transformer 68 preferably has a plurality of taps so that the terminals of secondary winding 14 of the control transformer can be connected thereto in different positions to vary the voltage at the slide terminal 70.

The auto transformer 68 is adapted for supplying alternating current at an adjustable voltage to the wires 64 and 66 and therethrough to the input terminals of the rectifier bank 60.

Wire 64 is connected directly with wire 72 which forms one terminal of the auto transformer whereas the slide terminal 70 is connected with blade 74 of a double-throw, three pole switch 76. The slide terminal 70 is also connected by a jumper 78 with a terminal 80 upon which blade 82 of switch 76 closes when the switch is thrown to the position in which it is shown in dot-dash outline in FIGURE 2. This blade 82, as will be seen, is connected directly with wire 66.

It will be evident that, when the switch 76 is thrown to its dot-dash position, the input terminals of rectifier bank 60 will be connected directly between wire 72 and slide terminal 70 of the auto transformer. The voltage supplied to rectifier bank 60 can be adjusted by moving terminal 70 or by changing the taps of the auto transformer and this can be accomplished with there being substantially no loss of power in the auto transformer so that, as compared to the use of a rheostat or a potentiometer, a considerable saving of power is had.

The arrangement of the present invention lends itself well to remote control of the control current and this is accomplished by availing of switch 76 and an auxiliary remote auto transformer 84. Auto transformer 84 can be substantially identical to auto transformer 68 and is arranged for being connected in circuit in the same way by availing of switch 76.

An extension leads from auto transformer 84 and is adapted for being plugged into the welder by means of a receptacle 86. When auto transformer 84 is plugged into receptacle 86 and switch 76 is thrown into the position it occupies in full lines in FIGURE 2, auto transformer 84 becomes effective for controlling the voltage supply to rectifier bank 60. The auto transformer 84, under the conditions specified above, has the lowermost selected tap 88 connected by wire 90 with the terminal on which blade 92 of the switch closes and which blade is connected with wire 72.

Similarly, the uppermost tap of auto transformer 84, at 94, is connected by wire 96 with the terminal on the blade 74 of the switch closes and which blade is connected with sliding terminal 70 of auto transformer 68.

The sliding terminal 98 of auto transformer 84 is connected by wire 100 with the terminal on which blade 82 closes and which blade, as mentioned before, is connected with wire 66.

Under the conditions specified above, auto transformer 68 supplies voltage to the effective outer terminals of auto transformer 84 while the supply of voltage to rectifier bank 60 is taken from between the slidable terminal 98 of auto transformer 84 and wire 72 which corresponds to tap 88 of auto transformer 84.

Figure 3:
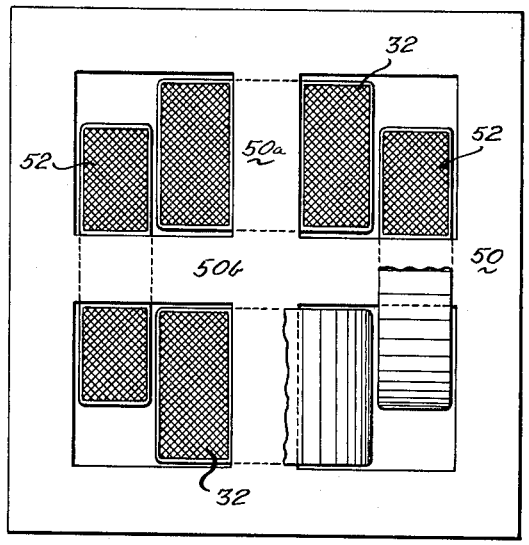
FIGURE 3 is a view, partially in section showing the construction of one of the reactors located in the secondary side of the welding circuit.

With reference to the construction of the reactors above referred to, one of these is illustrated in FIGURE 3 wherein it will be seen that iron core 50 comprises an outer part between within which are the intersecting legs 50a and 50b. The windings 32 are carried on leg 50a and are generally interconnected in additive relation.

Mounted on the leg 50b are the control windings 52 which are generally connected in opposition. It will be apparent that, in normal operation, the magnetic path for the windings 32 does not include the portions of leg 50b that extend through control coils 52, whereas variable energization of control coils 52 will bring about variable saturation of the magnetic path of the windings 32 thereby to vary the reactive effect of the said windings.

The operation of the welding device described is substantially conventional except for the manner in which the control current to the reactors is varied.

It will be understood that this invention is susceptible to modification and in order to adapt it to different usages and conditions and, accordingly, it is desired to comprehend such modifications within this invention as may fall within the scope of the appended claims.

I claim:

1. In an electric welder; a bank of main transformers each having a secondary winding, welding current output terminals, a plurality of saturable core reactors, each reactor having an iron core and a load winding and a control winding thereon, said load windings being connected in circuit individually with the secondary windings of said main transformers, a control transformer having a secondary winding, an auto transformer in circuit with the secondary winding of said control transformer, a rectifier connected between the auto transformer and the control windings of said reactors for effecting a variable supply of direct current to said control windings, a second auto transformer remote from said first auto transformer, and switch means selectively operable for connecting either the first mentioned auto transformer or the said second auto transformer in circuit with said secondary winding of the control transformer and said rectifier, each of said auto transformers comprising at least one adjustable tap connected with the rectifier for varying the voltage supplied to the said rectifier, the said control windings of said reactors being connected in series between the output terminals of said rectifier.

2. In an electric welder; a bank of main transformers each having a secondary winding, welding current output terminals, a plurality of saturable core reactors, each reactor having an iron core and a load winding and a control winding thereon, said load windings being connected in circuit individually with the secondary windings of said main transformers, a control transformer having a secondary winding, an auto transformer in circuit with the secondary winding of said control transformer, a rectifier connected between the auto transformer and the control windings of said reactors for effecting a variable supply of direct current to said control windings, a second auto transformer remote from said first auto transformer, and switch means selectively operable for connecting either the first mentioned auto transformer or the said second auto transformer in circuit with said secondary winding of the control transformer and said rectifier, each of said auto transformers comprising at least one adjustable tap connected with the rectifier for varying the voltage supplied to the said rectifier, the said control windings of said reactors being connected in series between the output terminals of said rectifier, there also being rectifier means in the circuit between the secondaries of said main transformers and said terminals.

3. In an electric welder; a bank of main transformers each having a secondary winding, welding current output terminals, a plurality of saturable core reactors, each reactor having an iron core and a load winding and a control winding thereon, said load windings being connected in circuit individually with the secondary windings of said main transformers, a control transformer having a secondary winding, an auto transformer in circuit with the secondary winding of said control transformer, a rectifier connected between the auto transformer and the control windings of said reactors for effecting a variable supply of direct current to said control windings, a second auto transformer remote from said first auto transformer, and switch means selectively operable for connecting either the first mentioned auto transformer or the said second auto transformer in circuit with said secondary winding of the control transformer and said rectifier, each of said auto transformers comprising at least one adjustable tap connected with the rectifier for varying the voltage supplied to the said rectifier, there also being rectifier means in the circuit between the secondaries of said main transformer and said terminals.

References Cited by the Examiner

UNITED STATES PATENTS 2,891,210   6/1959   Mulder _____ 321—25 X
3,034,016   5/1962   Morris et al. _____ 321—25

LLOYD McCOLLUM, *Primary Examiner.*